US012681242B2

(12) United States Patent
Sedor et al.

(10) Patent No.: US 12,681,242 B2
(45) Date of Patent: Jul. 14, 2026

(54) HIGH DENSITY FIBER CASSETTE AND ENCLOSURE

(71) Applicant: Panduit Corp., Tinley Park, IL (US)

(72) Inventors: Thomas M. Sedor, Orland Park, IL (US); Benjamin J. Berridge, Griffith, IN (US); Max W. Hibner, Glenview, IL (US); Gregory L. Kuffel, Plainfield, IL (US)

(73) Assignee: Panduit Corp., Tinley Park, IL (US)

( * ) Notice: Subject to any disclaimer, the term of this patent is extended or adjusted under 35 U.S.C. 154(b) by 441 days.

(21) Appl. No.: 17/887,576

(22) Filed: Aug. 15, 2022

(65) Prior Publication Data

US 2023/0073414 A1 Mar. 9, 2023

Related U.S. Application Data

(60) Provisional application No. 63/240,538, filed on Sep. 3, 2021.

(51) Int. Cl.
*G02B 6/38* (2006.01)
*G02B 6/44* (2006.01)

(52) U.S. Cl.
CPC ......... *G02B 6/3897* (2013.01); *G02B 6/3825* (2013.01); *G02B 6/3879* (2013.01); *G02B*

*6/4453* (2013.01); *G02B 6/3893* (2013.01); *G02B 6/4452* (2013.01)

(58) Field of Classification Search
CPC .. G02B 6/4453; G02B 6/4455; G02B 6/3893; G02B 6/3897; G02B 6/3879; G02B 6/3825
See application file for complete search history.

(56) References Cited

U.S. PATENT DOCUMENTS

| | | | | |
|---|---|---|---|---|
| 8,184,938 | B2 * | 5/2012 | Cooke | G02B 6/44526 |
| | | | | 385/136 |
| 10,715,271 | B1 * | 7/2020 | Cox | G02B 6/29364 |
| 11,686,912 | B1 * | 6/2023 | Woodward | G02B 6/44715 |
| | | | | 385/135 |
| 2011/0317974 | A1 * | 12/2011 | Krampotich | G02B 6/44526 |
| | | | | 385/135 |
| 2020/0310061 | A1 * | 10/2020 | Livingston | G02B 6/3825 |
| 2021/0191050 | A1 * | 6/2021 | Holmberg | G02B 6/3821 |
| 2021/0191059 | A1 * | 6/2021 | Bolster | G02B 6/44528 |

* cited by examiner

*Primary Examiner* — Michelle R Connelly
(74) *Attorney, Agent, or Firm* — Peter S. Lee; Christopher S. Clancy; James H. Williams

(57) ABSTRACT

A high-density fiber cassette and enclosure for installing the cassette are part of a cable management system. The cassette provides a more efficient design enabling installation of additional fiber connecter adapters, thus resulting in high fiber connector density within a given RU space.

16 Claims, 7 Drawing Sheets

200

HIGH DENSITY FIBER CASSETTE AND ENCLOSURE

CROSS-REFERENCE TO RELATED APPLICATION(S)

This application claims benefit to U.S. Provisional Patent Application No. 63/240,538, filed on Sep. 3, 2021, the entirety of which is hereby incorporated by reference herein.

BACKGROUND

This disclosure relates to data center management, and in particular high speed data transport fiber cabling systems. Optical fibers allow for transmission of communications over longer distances and at higher bandwidths than wire cables. Optical fibers are also advantageous for communication systems because signals suffer less loss than wire cables and are immune to electromagnetic interference. Optical fibers are therefore often used for high bandwidth, long distance applications. One of the primary functions of a data center is to provide connections between incoming and outgoing optical fiber connections.

As demand for high bandwidth increases, it is advantageous to use smaller and/or higher capacity adapters to minimize the amount of data center rack space needed per optical fiber port. Due to this, many users of data centers rely on smaller Local Connector adapters ("LC adapters") or Multi-fiber Push-on/Pull-off adapters ("MPO adapters"). To further maximize space efficiency, a rack or enclosure which maximizes the number of LC or MPO adapters that are fit into a standard space (e.g., a rack unit (RU)) may be advantageous. Additionally, it may be advantageous if a rack or enclosure allowed for replacing LC adapters with MPO adapters which provide multi-fiber capabilities.

SUMMARY OF THE INVENTION

The present disclosure provides for a high density fiber optic cassette and enclosure that maximizes the number of connections available per RU rack space, as well as provide for easy, non-disruptive maintenance or replacement of installed optical fiber cables.

DETAILED DESCRIPTION

Figure 1:
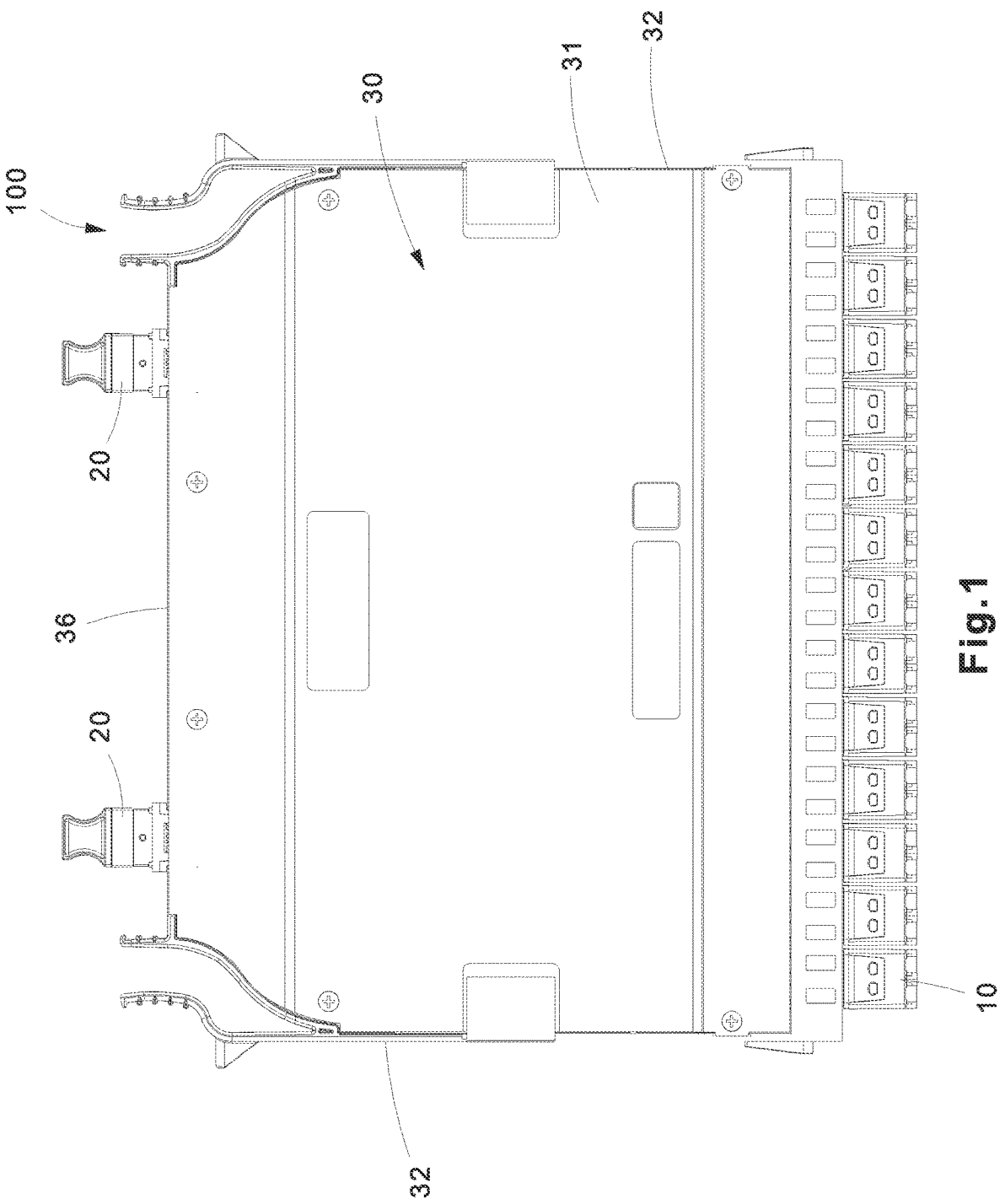
FIG. 1 is top-down view of an exemplary fiber optic cassette, according to some embodiments.

FIG. 1 shows a high-density fiber optic cassette ("cassette") 100 that as been configured to enable installation of thirteen (13) duplex LC adapters into corresponding openings 11 included on a front face 35 of the cassette 100. The thirteen (13) duplex LC adapters translates to up to 26 unique individual fiber optic fibers being received by the cassette 100. The dimensions of the cassette 100 may, for example, be the same as a double wide HD Flex cassette manufactured by Panduit Corp, such that two cassettes 100 may in installed in a single row of a tray and/or enclosure that fits within a single RU width (e.g., approximately 19 inches). Whereas earlier versions of the double wide HD Flex cassette enabled twelve (12) duplex LC adapters, the openings 11 of the current cassette 100 have been rearranged on the front face 35 to enable the addition of the additional duplex LC adapter, for a total of thirteen (13) duplex LC adapters installable to the front face 35 of the cassette 100.

Figure 7:
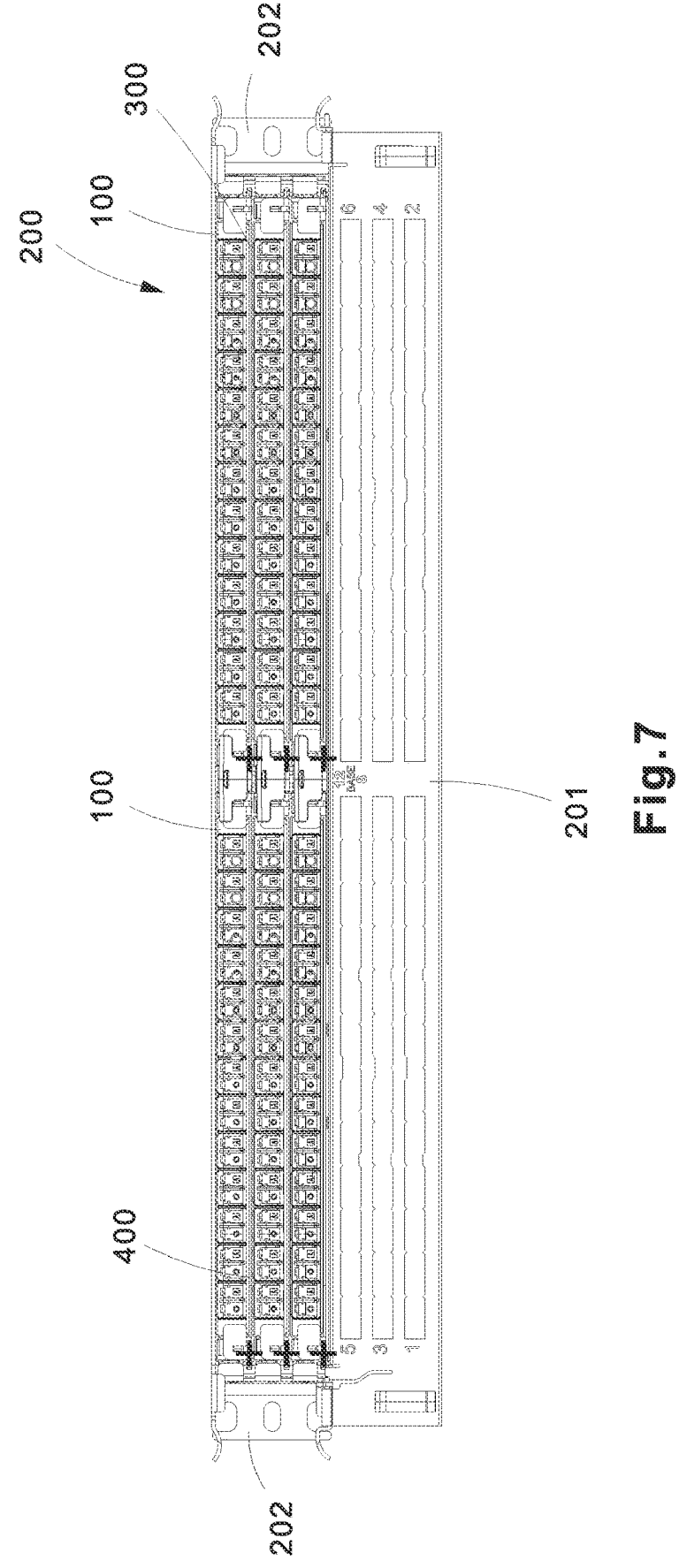
FIG. 7 is a front side view of an exemplary enclosure including the fiber optic cassette shown in FIG. 1 installed, according to some embodiments.

FIG. 7 shows a 1 RU enclosure 200 (e.g., approximately 1.75 inches high and 19 inches wide) having a plurality of the cassettes 100 installed. Specifically, the dimensions of the cassette 100 enable two of the cassettes 100 to be installed in a same row within the enclosure 200, and to have a total of three such rows that fit within the enclosure 200. So, when fully occupied, the enclosure 200 fits up to six of the cassettes 100. By utilizing the cassette 100, up to a total of 156 fibers may be received within the 1 RU spaced enclosure 200. This is an increase from the up to 144 fibers that could be received using earlier versions of the double wide cassette that included only twelve (12) LC adapters.

With the additional space found on the front face 35 of the cassette 100, different combinations of adapter types may also be implemented to achieve greater connector density within the cassette 100, which in turn may result in greater than 144 fiber connector density per the 1 RU space provided by the enclosure 200. For example, according to some embodiments, an opening may be formed on the front face 35 so that instead of adding the additional duplex LC adapter 10, a single LC adapter may be installed instead. According to some embodiments, instead of adding the additional duplex LC adapter 10, an MPO adapter, a CS adapter, an SN adapter, or other known connector type adapter may be installed instead to achieve different connector densities.

FIG. 1 also shows two MPO adapters 20 at a rear face 36 of the cassette 100. The MPO adapters are available in a variety of base fiber counts including, but not limited to, 8, 12, 24, 32, 48, 60, and 72 fibers. According to alternative embodiments, there may be a single MPO adapter at the rear face 36, or more than two MPO adapters at the rear face 36, to enable adequate interfacing with the fiber connections received by the up to thirteen (13) duplex LC adapters 10 installed at the front face 35 of the cassette 100. According to other embodiments, the two MPO adapters 20 may be replaced with one or more different types of fiber connector adapters (e.g., different base fiber count MPO adapter, SN adapter, or CS type of fiber adapters), to match the required number of fiber connections being used by the connector adapters at the front face 35 of the cassette.

Figure 2:
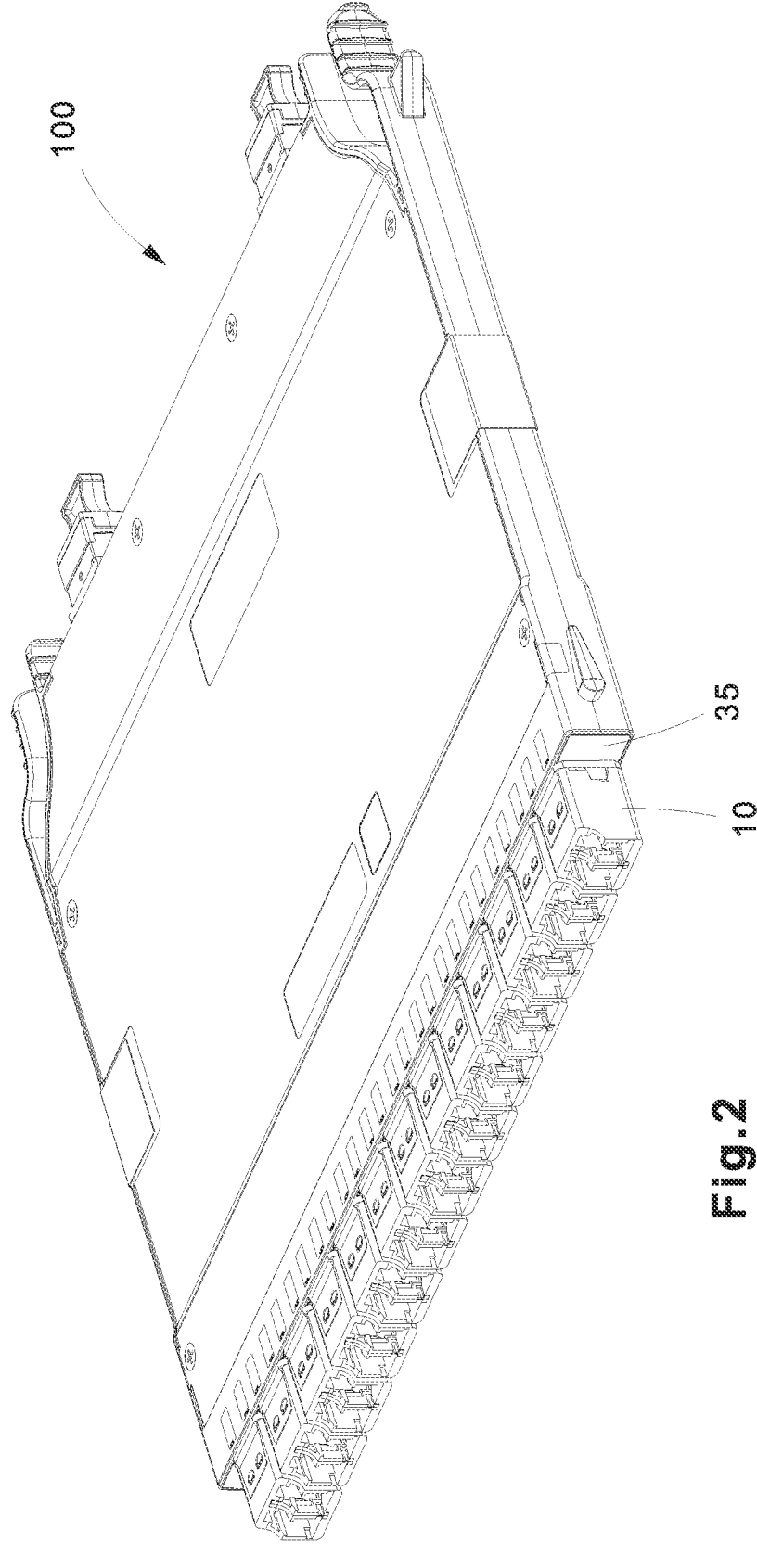
FIG. 2 is a perspective view of the fiber optic cassette shown in FIG. 1.
Figure 3:
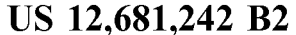
FIG. 3 is a perspective view of the fiber optic cassette shown in FIG. 1 where two duplex fiber optic adapters have been removed to reveal front openings on a front face of the fiber optic cassette.

FIG. 2 shows a perspective view of the cassette 100 where all the thirteen (13) openings 11 on the front face 35 are occupied by a duplex LC adapter 10. FIG. 3 shows a perspective view of the cassette 100 where two of the duplex LC adapters 10 have been removed for illustrative purposes, to reveal their corresponding openings 11 and a divider wall 12 that separates their individual opening 11. The divider wall 12 is included between adjacent openings 11. A front of the divider wall 12 may be slightly recessed from the plane of the front face 35 as shown in FIG. 3, or according to other embodiments a front of the divider wall 12 may be flush with the plane of the front face 35.

The cassette 100 is shown to include a housing body 30 comprising a top cover 31, a side wall 32 at two opposing sides, the front face 35, the rear face 36, and a bottom floor (not illustrated) that is opposite the top cover 31. The cassette 100 also includes a rear post 34 for abutting against a rear stop located at a rear end of the enclosure 200 that prevents the cassette 100 from extending out through a rear opening in the enclosure 200, as well as a release latch 37 for use when removing the cassette 100 via a rear opening of the enclosure 200. The cassette also includes a front post 33 that acts to abut against a front stop located at a front end of the enclosure 200 that prevents the cassette 100 from extending out through a front opening in the enclosure 200.

Figures 4, 5, 6:
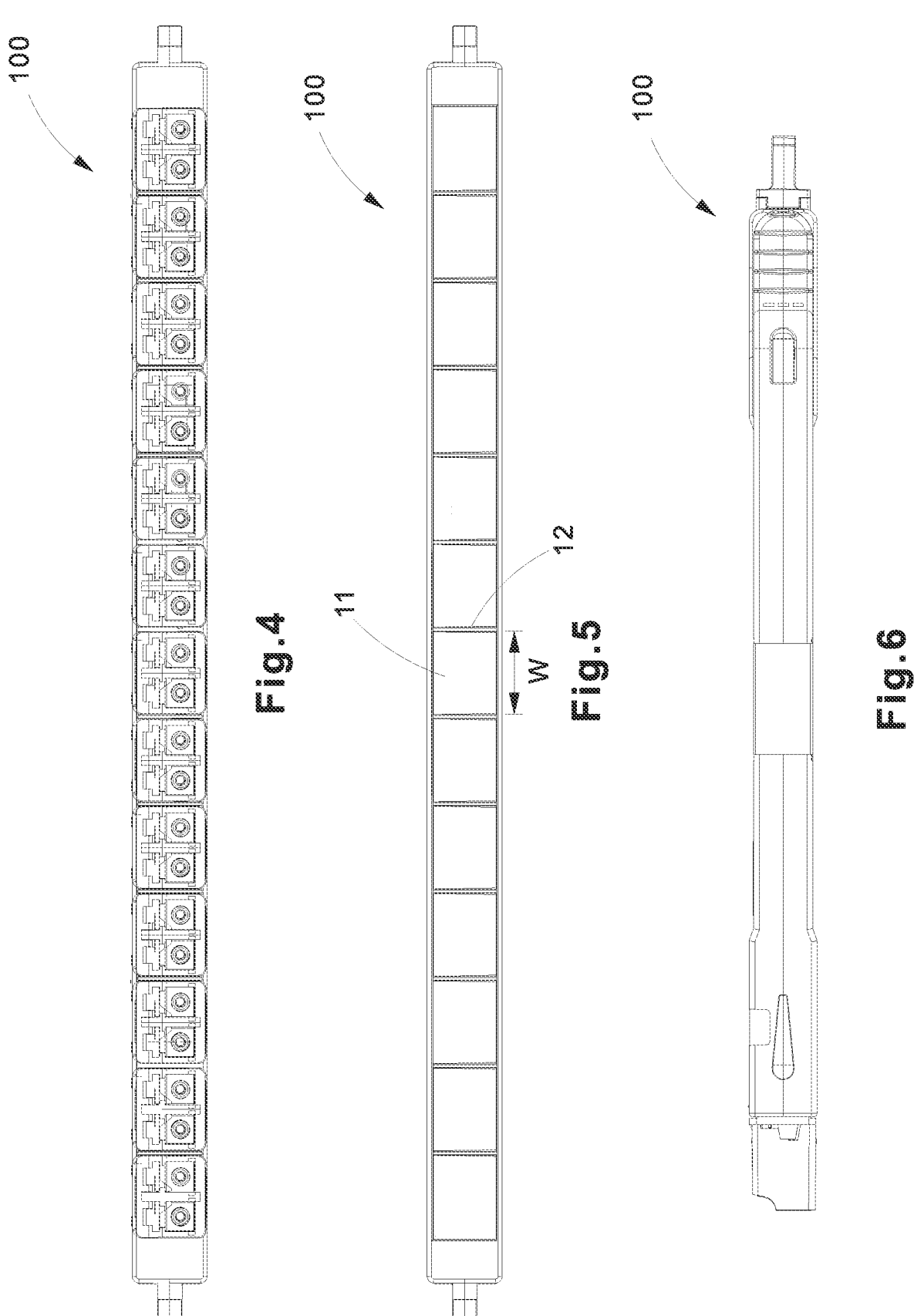
FIG. 4 is a front-side view of the fiber optic cassette shown in FIG. 1, where the fiber optic adapters remain installed on the front face.
FIG. 5 is a front-side view of the fiber optic cassette shown in FIG. 1, where the fiber optic adapters have been removed to reveal front openings on the front face.
FIG. 6 is a side view of the fiber optic cassette shown in FIG. 1.

FIG. 4 is a front head-on view of the cassette 100 where all the duplex LC adapters 10 have been installed into their respective openings 11. FIG. 5 shows a front head-on view of the cassette 100 where all the duplex LC adapters 10 have been removed from their respective openings 11. Each opening 11 has a width W that is wide enough to accept the duplex LC adapter 10. According to some embodiments, the opening 11 has a width W that is wider than a width of the duplex LC adapter 10 by a predetermined margin of buffering space (e.g., +1-10%). For example, when the duplex LC adapter 10 has a width of approximately 0.50 in., the opening 11 may have a width of approximately 1 inch plus a margin for buffering space of 0.005-0.05 inches. FIG. 6 shows a side view of the cassette 100.

Figure 8:
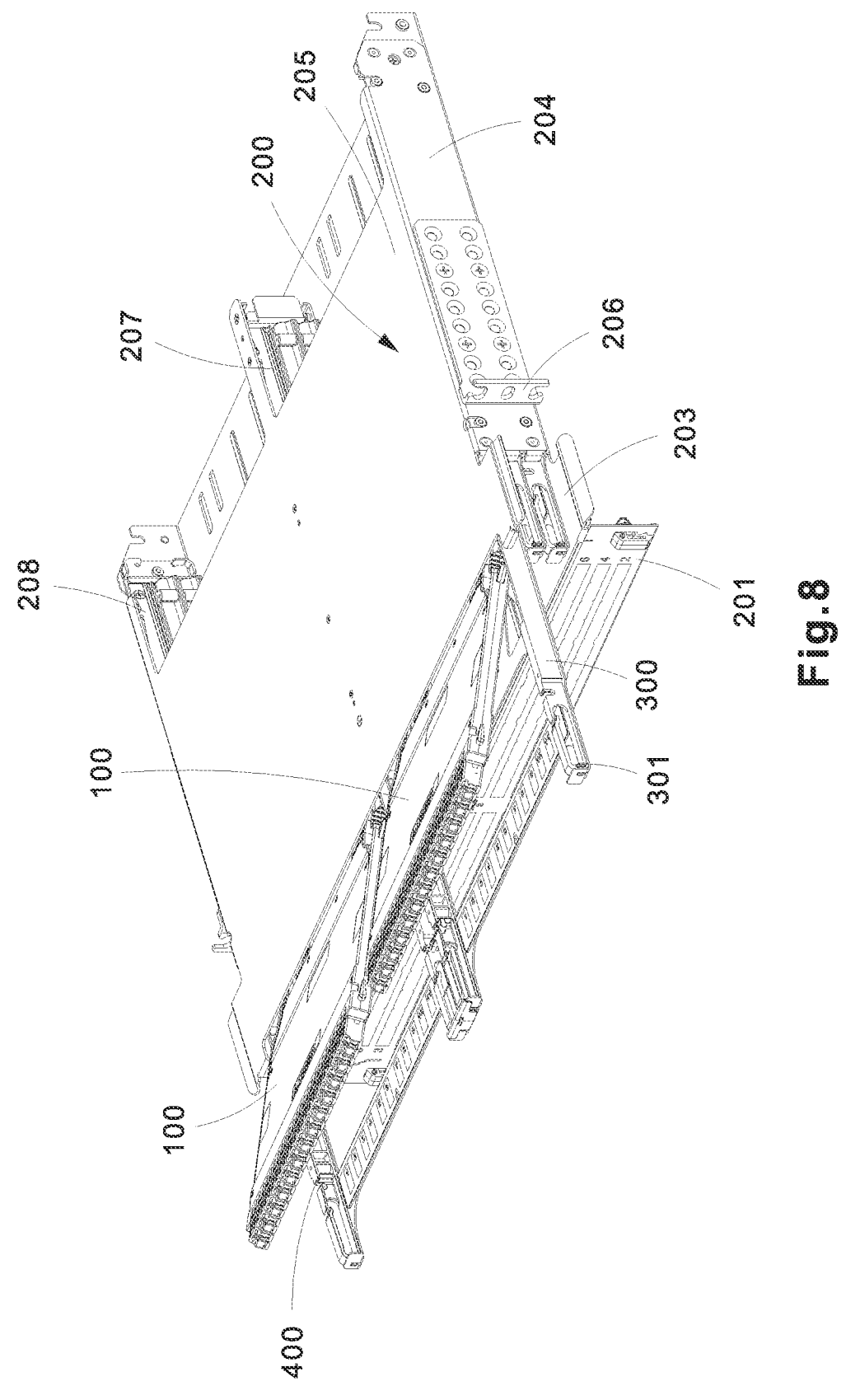
FIG. 8 is a perspective view of the enclosure shown in FIG. 7 where a tray is extended out to illustrate an installation of the fiber optic cassette, according to some embodiments.

FIG. 7 is a front-side head-on view of the enclosure 200, where the enclosure 200 is fully installed with six cassettes 100 within the 1 RU space of the enclosure 200. For a given row within the enclosure 200, there are two trays for holding their own cassette 100. For example, a first tray 300 occupies a first half of the row and holds its own cassette 100, while a second tray 400 occupies a second half of the row and holds its own cassette 100. Each tray 300, 400 is translatable along a front to back direction independently from each other via the use of a center tray guide 207 and side tray guide 208 found at each side of the enclosure 200, as shown in FIG. 8. The enclosure 200 also includes a front access door 201 that swings open and closed about a hinge to expose and cover the cassettes 100 that are installed into the enclosure 200.

FIG. 8 is a perspective view of the enclosure 200 where the top row trays 300, 400 are extended out to a cassette installation position to enable the cassettes 100 to be installed onto their respective trays 300, 400. FIG. 8 also shows the enclosure 200 including front loops 301 that are located in front of the trays 300, 400 so that the front loops 301 may be utilized for cable management of fiber cables being used to connect to the cassettes 100. The enclosure 200 is comprised of a top cover 205, side walls 204 at opposite sides to each other, and a bottom surface 203 that is opposite the top cover 205. A mounting bracket 206 is also attached to each side wall 204 for securing the enclosure 200 to a rack using fasteners (not shown).

Figure 9:
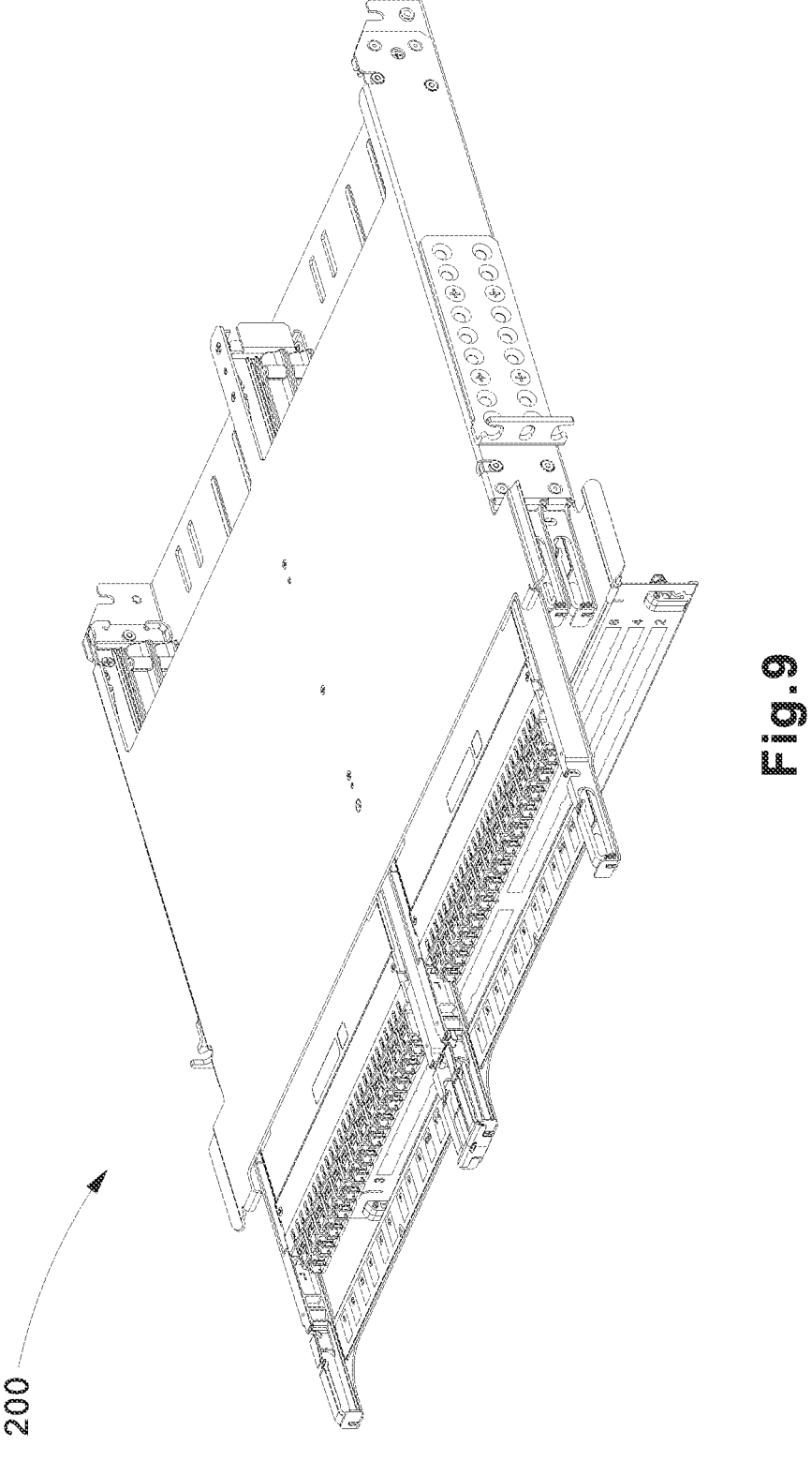
FIG. 9 is a perspective view of the enclosure shown in FIG. 7 where a tray is extended out having the fiber optic cassette installed, according to some embodiments.

FIG. 9 is a perspective view of the enclosure 200 where the top row trays 300, 400 are extended out to demonstrate how the cassettes 100 have been installed onto their respective trays 300, 400.

According to some embodiments, the cassette 100 is intended to be installed into the cable management systems, enclosures, and racks described in U.S. Pat. No. 9,690,065, issued Jun. 27, 2017, U.S. Pat. No. 10,215,944, issued Feb. 26, 2019, and U.S. Pat. No. 11,048,055, issued Jun. 29, 2021, the entirety of all of which are incorporated by reference herein.

As is readily apparent from the foregoing, various non-limiting embodiments of a high-density fiber optic cassette and enclosure have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A fiber cassette comprising:
a body comprising:
   a top cover;
   a first side wall;
   a second side wall opposite to the first side wall;
   a rear face; and
   a front face including a plurality of openings arranged in a single layer horizontal row, each of the openings configured to receive a duplex LC type fiber connector adapter that enables at least twenty-six (26) fiber optic connections in a horizontal row, wherein a divider wall spans from a top to a bottom of the front face and is positioned between adjacent openings included in the plurality of openings on the front face; and
   wherein the fiber cassette is configured to be installed into a 1 RU enclosure including a tray, the tray being configured to removably install up to, but not more than, two (2) of the same fiber cassettes to enable up to fifty-two (52) fiber optic connections in a single layer horizontal row.

2. The fiber cassette of claim 1, wherein the plurality of openings includes thirteen openings.

3. The fiber cassette of claim 1, wherein each opening included in the plurality of openings has a width that is between 1-10% wider than a width of the duplex LC adapter to be installed into the opening.

4. The fiber cassette of claim 1, wherein the fiber cassette is a double wide cassette, wherein no more than two double wide cassettes are configured to be installed in a same row within an RU width enclosure.

5. The fiber cassette of claim 1, wherein the plurality of openings includes thirteen openings for each installing a duplex LC adapter; and
   wherein the 1 RU enclosure includes three (3) trays, each of the three (3) trays configured to hold up to, but not more than, two (2) fiber cassettes such that when fully populated the 1 RU enclosure enables up to 156 fiber connections.

6. The fiber cassette of claim 1, wherein the rear face includes at least one opening for installing at least one fiber connector adapter for coupling to at least one of the fiber connector adapters installed into the plurality of openings at the front face.

7. The fiber cassette of claim 1, wherein the first side wall includes at least one stopping member.

8. The fiber cassette of claim 1, wherein a front of the divider wall is flush with a plane of the front face.

9. The fiber cassette of claim 1, wherein a front of the divider wall is recessed behind a plane of the front face.

10. A fiber enclosure comprising:

a chassis;

a first cassette tray installed within the chassis, the first cassette tray configured to translate within the fiber enclosure and hold a first fiber cassette, wherein the fiber enclosure is a 1 RU sized enclosure; and the first fiber cassette comprising:

a body comprising:

a top cover;

a first side wall;

a second side wall opposite to the first side wall;

a rear face; and a front face including a plurality of openings arranged in a single layer horizontal row, each of the openings configured to receive a duplex type fiber connector adapter that enables at least twenty-six (26) fiber optic connections in a horizontal row, wherein a divider wall spans from a top to a bottom of the front face and is positioned between adjacent openings included in the plurality of openings on the front face; and a second fiber cassette configured to be installed next to the first fiber cassette on the first cassette tray, wherein the second fiber cassette includes a second front face including a plurality of second openings arranged in a single layer horizontal row, each of the second openings configured to each receive a second fiber connector adapter configured to enable at least twenty-six (26) fiber optic connections in a horizontal row, such that when the first fiber cassette and the second fiber cassette are installed onto the first cassette tray up to fifty-two (52) fiber optic connections are enabled within the 1 RU width of the fiber enclosure.

11. The fiber enclosure of claim 10, further comprising:

a second cassette tray installed within the chassis and below the first cassette tray, the second cassette tray configured to translate within the fiber enclosure and hold a third fiber cassette; and the third fiber cassette comprising:

a body including a top cover, a first side wall, a second side wall opposite to the first side wall, a rear face, and a front face; and wherein the front face includes a plurality of openings configured to receive more than twelve adapters.

12. The fiber enclosure of claim 10, wherein the plurality of openings on the front face of the first fiber cassette includes 13 openings.

13. The fiber enclosure of claim 10, wherein each opening on the front face of the first fiber cassette has a width that is between 1-10% wider than a width of the duplex LC adapter to be installed into the opening.

14. The fiber enclosure of claim 10, wherein the first fiber cassette is a double wide cassette and the second fiber cassette is a double wide cassette such that only the first fiber cassette and the second fiber cassette may fit onto the first fiber tray within the 1 RU width of the fiber enclosure.

15. The fiber enclosure of claim 10, wherein the plurality of openings on the front face of the first fiber cassette includes 13 openings for each installing a duplex LC adapter; and wherein when the 1 RU enclosure is fully populated the 1 RU enclosure enables up to 156 fiber connections.

16. The fiber enclosure of claim 10, wherein a front of the divider wall is recessed behind a plane of the front face of the first fiber cassette.

\* \* \* \* \*